US008854452B1

(12) United States Patent
Raffle

(10) Patent No.: US 8,854,452 B1
(45) Date of Patent: Oct. 7, 2014

(54) FUNCTIONALITY OF A MULTI-STATE BUTTON OF A COMPUTING DEVICE

(75) Inventor: Hayes Solos Raffle, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 125 days.

(21) Appl. No.: 13/472,658

(22) Filed: May 16, 2012

(51) Int. Cl.
*H04N 7/00* (2011.01)
*H04N 5/225* (2006.01)
*H04N 5/222* (2006.01)
*G09G 5/00* (2006.01)

(52) U.S. Cl.
USPC 348/115; 348/207.11; 348/158; 348/E13.036; 348/333.01; 348/333.02; 345/7; 345/8; 345/9

(58) Field of Classification Search
USPC .......... 348/207.11, 115, 158, E13.036, 14.03, 348/333.01, 333.02; 345/7–9; 351/41, 53
See application file for complete search history.

(56) References Cited

U.S. PATENT DOCUMENTS

| 6,727,830 | B2 | 4/2004 | Lui | |
|---|---|---|---|---|
| 7,721,227 | B2 | 5/2010 | Ronkainen | |
| 7,979,805 | B2 | 7/2011 | Liu | |
| 8,531,394 | B2 * | 9/2013 | Maltz | 345/156 |
| 2003/0142227 | A1 * | 7/2003 | van Zee | 348/333.1 |
| 2004/0005915 | A1 * | 1/2004 | Hunter | 455/575.1 |
| 2004/0056061 | A1 * | 3/2004 | Yang | 224/607 |
| 2005/0185060 | A1 * | 8/2005 | Neven | 348/211.2 |
| 2006/0209017 | A1 * | 9/2006 | Cohen et al. | 345/156 |
| 2008/0181460 | A1 * | 7/2008 | Tamaru | 382/103 |
| 2009/0027539 | A1 * | 1/2009 | Kunou | 348/333.01 |
| 2010/0214216 | A1 * | 8/2010 | Nasiri et al. | 345/158 |
| 2011/0249122 | A1 * | 10/2011 | Tricoukes et al. | 348/158 |
| 2012/0013782 | A1 * | 1/2012 | Mori | 348/333.02 |
| 2012/0075182 | A1 * | 3/2012 | Kim et al. | 345/158 |
| 2012/0099000 | A1 * | 4/2012 | Kim | 348/231.99 |

FOREIGN PATENT DOCUMENTS

WO     2011045786     4/2011

* cited by examiner

*Primary Examiner* — Lin Ye
*Assistant Examiner* — Quan Pham

(57) ABSTRACT

Methods and systems for using a multi-state button are described. A computing device may be configured to receive an input associated with a press state of a button. The computing device may be configured to cause an image-capture device to capture an image from a point-of-view (POV) of the computing device based on the input corresponding to a first press state on the button and cause the image-capture device to capture a video from the POV of the computing device based on the input corresponding to a second press state on the button. The computing device may be configured, based on the input corresponding to a partial press state of the button, to cause the image-capture device to capture the image and/or the video; and provide a search query based on the image and/or the video.

18 Claims, 10 Drawing Sheets

FIGURE 5A  FIGURE 5B  FIGURE 5C

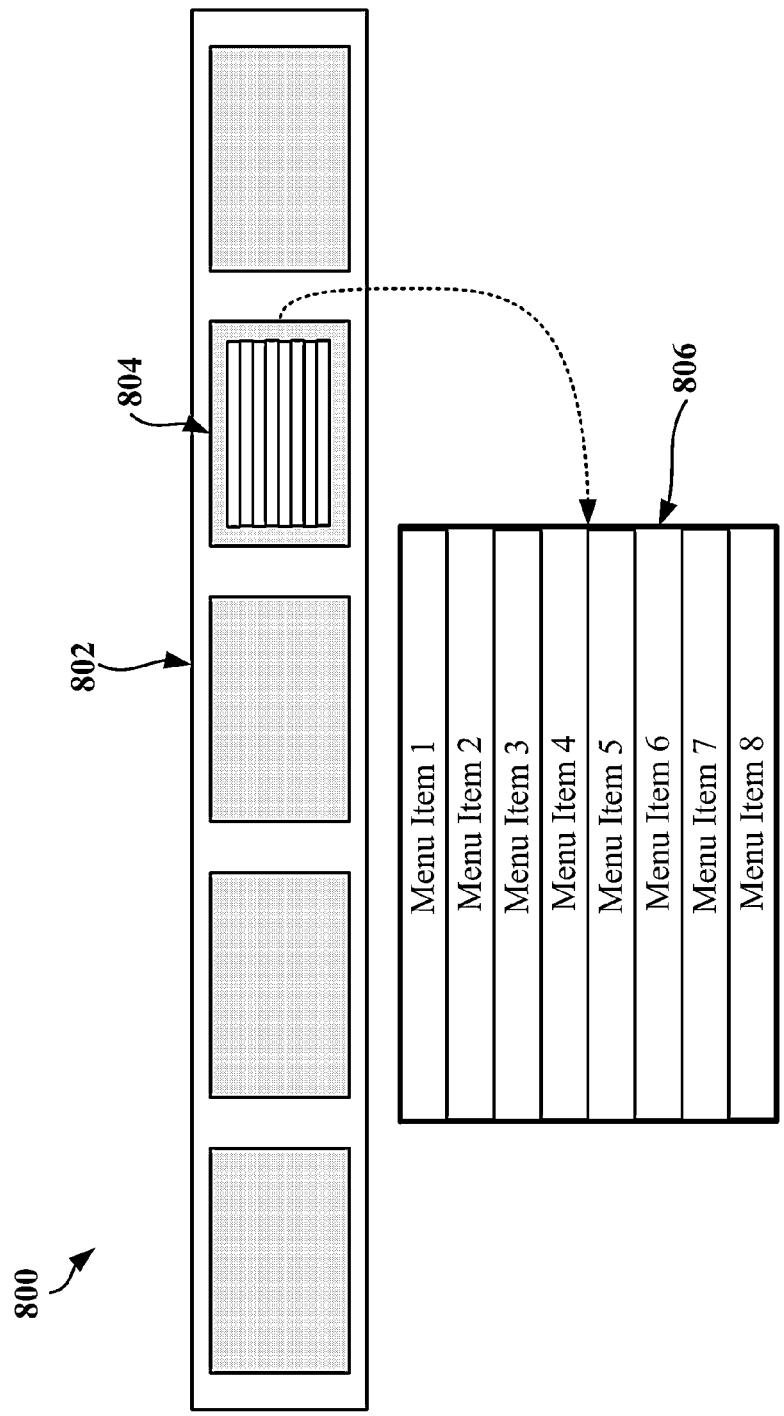

COMPUTER PROGRAM PRODUCT 1000

SIGNAL BEARING MEDIUM 1001

PROGRAM INSTRUCTIONS 1002

- RECEIVING, AT A WEARABLE COMPUTING DEVICE, AN INPUT ASSOCIATED WITH A PARTIAL PRESS STATE, FOR AT LEAST A PREDETERMINED AMOUNT OF TIME, OF A BUTTON COUPLED TO THE WEARABLE COMPUTING DEVICE

- CAUSING, BASED ON THE INPUT, AN IMAGE-CAPTURE DEVICE COUPLED TO THE WEARABLE COMPUTING DEVICE TO CAPTURE AN IMAGE OR A VIDEO FROM A POINT-OF-VIEW (POV) OF THE WEARABLE COMPUTING DEVICE

- PROVIDING A SEARCH QUERY BASED ON THE IMAGE OR THE VIDEO

| COMPUTER READABLE MEDIUM 1003 | COMPUTER RECORDABLE MEDIUM 1004 | COMMUNICATIONS MEDIUM 1005 |

FIGURE 10

FUNCTIONALITY OF A MULTI-STATE BUTTON OF A COMPUTING DEVICE

BACKGROUND

Augmented reality generally refers to a real-time view of a real-world environment that is augmented with additional content. A user may experience augmented reality through the use of a computing device. The computing device may be configured to generate the real-time view of the environment, either by allowing a user to directly view the environment or by allowing the user to indirectly view the environment by generating and displaying a real-time representation of the environment to be viewed by the user.

The additional content may include, for example, a user-interface through which the user may interact with the computing device. The computing device may overlay the view of the environment with the user-interface such that the user sees the view of the environment and the user-interface at the same time.

SUMMARY

The present application discloses systems and methods for using a multi-state button of a computing device. In one aspect, a method is described. The method may comprise receiving, at a wearable computing device, an input associated with a partial press state, for at least a predetermined amount of time, of a button coupled to the wearable computing device. The method also may comprise causing, based on the input, an image-capture device coupled to the wearable computing device to capture an image or a video from a point-of-view (POV) of the wearable computing device. The method further may comprise providing a search query based on the image or the video.

In another aspect, a non-transitory computer readable medium having stored thereon instructions executable by a wearable computing device to cause the wearable computing device to perform functions is described. The functions may comprise receiving press state information associated with a press state of a button coupled to the wearable computing device. The press state may comprise one of a partial press state, a first press state, and second press state. The first press state and the second press state may be distinguishable based on pressed periods of time related to the press state of the button. The functions also may comprise generating a display of a menu. The menu may comprise one or more menu items, where the one or more menu items are based on the press state information.

In still another aspect, a system is described. The system may comprise an image-capture device. The system also may comprise a button configured to provide information associated with a press state of the button. The press state may comprise one of a partial press state, a first press state, and second press state. The first press state and the second press state may be distinguishable based on pressed periods of time related to the press state of the button. The system further may comprise a wearable computing device in communication with the image-capture device and the button. The wearable computing device may be configured to receive an input associated with the press state of the button. The wearable computing device also may be configured to cause the image-capture device to capture an image from a point-of-view (POV) of the wearable computing device, based on the input corresponding to the first press state. The wearable computing device further may be configured to cause the image-capture device to capture a video from the POV of the wearable computing device, based on the input corresponding to the second press state. Based on the input corresponding to the partial press state, the wearable computing device may be configured to cause the image-capture device to capture the image or the video; and provide a search query based on the image or the video.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 8A illustrates aspects of an example display including menus, in accordance with an embodiment.

FIG. 10 is a schematic illustrating a conceptual partial view of an example computer program product that includes a computer program for executing a computer process on a computing device, arranged according to at least some embodiments presented herein.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In an example, a wearable computing device may be configured to receive an input associated with a press state of a button coupled to the wearable computing device. The wearable computing device also may be configured to cause an image-capture device coupled to the wearable computing device to capture an image from a point-of-view (POV) of the wearable computing device, based on the input corresponding to a first press state of the button. The wearable computing device further may be configured to cause the image-capture device to capture a video from the POV of the wearable computing device, based on the input corresponding to a second press state of the button. The first press state and the second press state may be distinguishable based on pressed periods of time related to the press state of the button. The wearable computing device also may be configured, based on the input corresponding to a partial press state of the button, to cause the image-capture device to capture the image or the video based on the input; and provide a search query based on the image or the video. The wearable computing device further may be configured to receive search results relating to the search query from the search server and, in some examples, generate a display of the search results on a head-mounted display coupled to the wearable computing device.

In another example, the wearable computing device may be configured to generate a display of a menu including menu items. The menu items may be based on the press state (e.g., partial press state, first press state, or second press state). At least one of the menu items may be expandable into a sub-menu. Sub-menu items of the sub-menu also may be based on the press state.

Figure 1A:
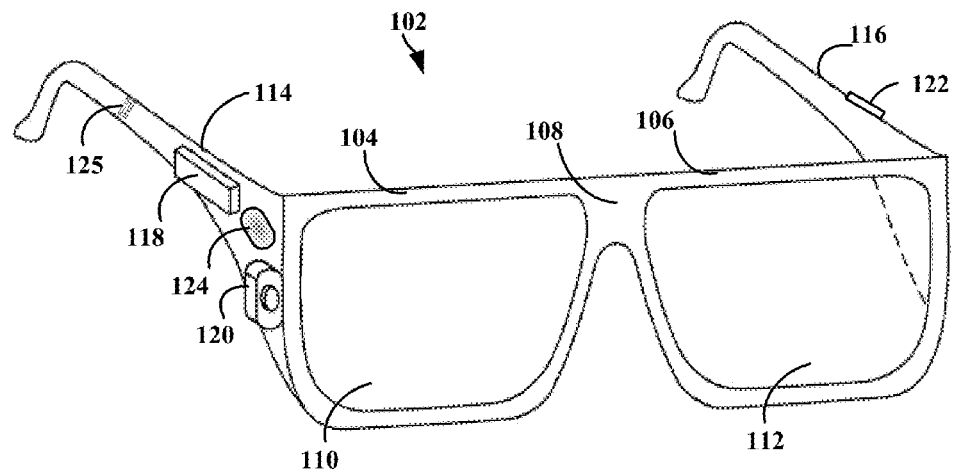
FIG. 1A illustrates an example system for receiving, transmitting, and displaying data, in accordance with an embodiment.

Referring now to the Figures, FIG. 1A illustrates an example system for receiving, transmitting, and displaying data, in accordance with an embodiment. The system is shown as a wearable computing device in a form of a head-mounted device 102 as an example. Other types of wearable computing devices could additionally or alternatively be used. As illustrated in FIG. 1A, the head-mounted device 102 may include frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials are possible as well.

One or more of each of the lens elements 110, 112 may be formed of any material that can suitably display a projected image or graphic (e.g., a user-interface). Each of the lens elements 110, 112 may also be sufficiently transparent to allow a user to see through the lens element. Combining these two features of the lens elements 110, 112 may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the head-mounted device to the user. In some examples, the extending side-arms 114, 116 may further secure the head-mounted device 102 to the user by extending around a rear portion of the user's head. Additionally or alternatively, for example, the head-mounted device 102 may connect to or be affixed within a head-mounted helmet structure. Other possibilities exist as well.

The head-mounted device 102 may also include an on-board computing system 118, a video camera 120, at least one sensor 122, a finger-operable touch pad 124, and a button 125. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be connected via a wired or wireless connection to the head-mounted device 102). The on-board computing system 118 may include a processor and data storage, for example, among other components. The on-board computing system 118 may be configured to receive and analyze data from the video camera 120, the at least one sensor 122, and the finger-operable touch pad 124 (and possibly from other user-input devices, user-interfaces, or both) and generate images and graphics for output by the lens elements 110 and 112. The on-board computing system 118 may additionally include a speaker or a microphone for user input (not shown).

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Video cameras with a small form-factor, such as those used in cell phones or webcams, for example, may be incorporated into an example of the head-mounted device 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where images and/or graphics appear to interact with the real-world view perceived by the user.

The at least one sensor 122 is shown on the extending side-arm 116 of the head-mounted device 102; however, the at least one sensor 122 may be positioned on other parts of the head-mounted device 102. The sensor at least one 122 may include one or more movement sensors, such as one or both of a gyroscope or an accelerometer, for example. Other sensing devices may be included within, or in addition to, the at least one sensor 122, or other sensing functions may be performed by the at least one sensor 122.

The finger-operable touch pad 124 is shown on the extending side-arm 114 of the head-mounted device 102; however, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel and/or planar to a surface of the finger-operable touch pad 124, in a direction normal to the surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function. For example, the finger operable touch pad may include a button with various functionalities.

The button 125 is shown on the extending arm 114 of the head-mounted device 102; however, the button 125 may be positioned on other parts of the head-mounted device 102. Also, more than one button such as the button 125 may be present on the head-mounted device 125.

Figure 1B:
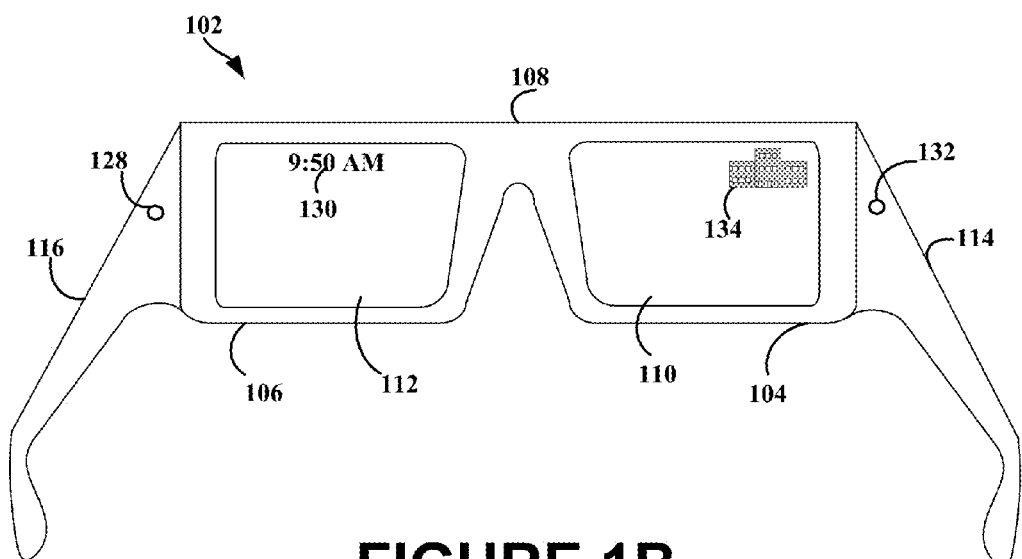
FIG. 1B illustrates an alternate view of the system illustrated in FIG. 1A, in accordance with an embodiment.

FIG. 1B illustrates an alternate view of the system illustrated in FIG. 1A, in accordance with an example. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system. Further, in some examples, the lens elements 110, 112 may include a coating that reflects the light projected onto them from the projectors 128, 132.

In alternative examples, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. In these examples, a reflective coating on the lenses 110, 112 may be omitted. Other possibilities exist as well.

Figure 2:
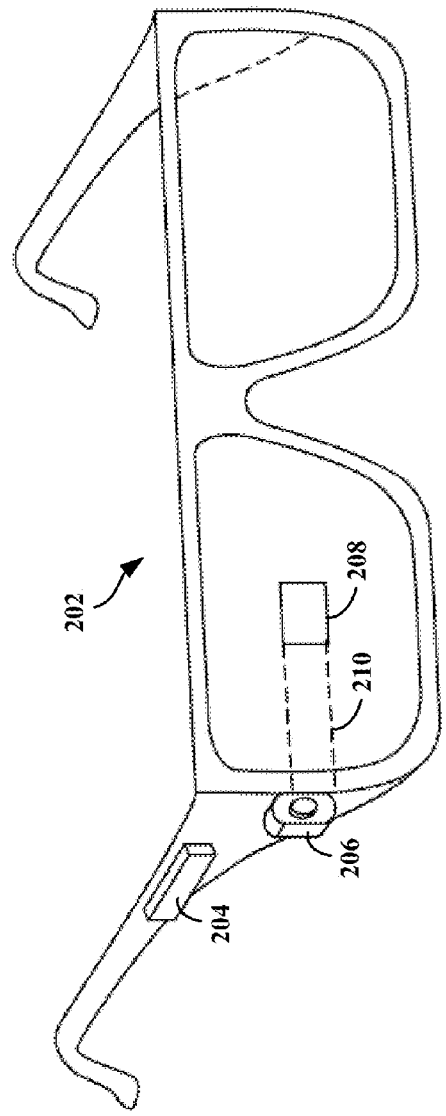
FIG. 2 illustrates another example system for receiving, transmitting, and displaying data, in accordance with an embodiment.

FIG. 2 illustrates another example system for receiving, transmitting, and displaying data, in accordance with an embodiment. The system is shown in the form of a wearable computing device 202. The wearable computing device 202 may include frame elements, side-arms, and lens elements, which may be similar to those described above in connection with FIGS. 1A and 1B. The wearable computing device 202 may additionally include an on-board computing system 204 and a video camera 206, which may also be similar to those described above in connection with FIGS. 1A and 1B. The video camera 206 is shown mounted on a frame of the wearable computing device 202; however, the video camera 206 may be mounted at other positions as well.

As shown in FIG. 2, the wearable computing device 202 may include a single display 208 which may be coupled to the device. The display 208 may be similar to the display described above in connection with FIGS. 1A and 1B. The display 208 may be formed on one of the lens elements of the wearable computing device 202, and may be configured to overlay images and/or graphics (e.g., a user-interface) on the user's view of the physical world. The display 208 is shown to be provided in a center of a lens of the wearable computing device 202; however, the display 208 may be provided in other positions. The display 208 is controllable via the computing system 204 that is coupled to the display 208 via an optical waveguide 210.

Figure 3:
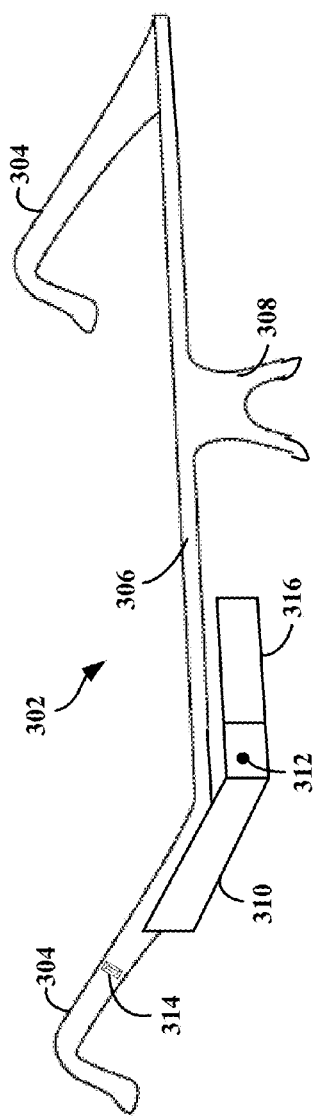
FIG. 3 illustrates another example system for receiving, transmitting, and displaying data, in accordance with an embodiment.

FIG. 3 illustrates another example system for receiving, transmitting, and displaying data, in accordance with an embodiment. The system is shown in the form of a wearable computing device 302. The wearable computing device 302 may include side-arms 304, a center frame support 306, and a bridge portion with nosepiece 308. In the example shown in FIG. 3, the center frame support 306 connects the side-arms 304. The wearable computing device 302 does not include lens-frames containing lens elements. The wearable computing device 302 may additionally include an on-board computing system 310 and a video camera 312, which may be similar to those described above in connection with FIGS. 1A and 1B. Additionally, the wearable computing device 302 may include a button 314 that, for example, may include a multi-state button with multiple corresponding functions.

The wearable computing device 302 may include a single lens element 316 that may be coupled to one of the side-arms 304 or the center frame support 306. The lens element 316 may include a display, which may be similar to the display described above in connection with FIGS. 1A and 1B, and may be configured to overlay images and/or graphics (e.g., a user-interface, menus, etc.) upon the user's view of the physical world. In one example, the single lens element 316 may be coupled to a side of the extending side-arm 304. The single lens element 316 may be positioned in front of or proximate to a user's eye when the wearable computing device 302 is worn by a user. For example, the single lens element 316 may be positioned below the center frame support 306, as shown in FIG. 3.

In some examples, a wearable computing device (such as any of the wearable computing devices 102, 202, and 302 described above) may be configured to operate in a computer network structure. To this end, the wearable computing device may be configured to connect to one or more remote devices using a communication link or links.

The remote device(s) may be any type of computing device or transmitter, such as, for example, a laptop computer, a mobile telephone, or tablet computing device, etc., that is configured to transmit data to the wearable computing device. The wearable computing device may be configured to receive the data and, in some cases, provide a display that is based at least in part on the data.

The remote device(s) and the wearable computing device may each include hardware to enable the communication link(s), such as processors, transmitters, receivers, antennas, etc. The communication link(s) may be a wired or a wireless connection. For example, the communication link may be a wired serial bus, such as a universal serial bus or a parallel bus, among other connections. As another example, the communication link may be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device(s) may be accessible via the Internet and may include a computing cluster associated with a particular web service (e.g., social-networking, photo sharing, address book, etc.).

As described above in connection with FIGS. 1-3, an example wearable computing device may include, or may otherwise be communicatively coupled to, a computing system, such as computing system 118, computing system 204, or computing system 310.

Figure 4:
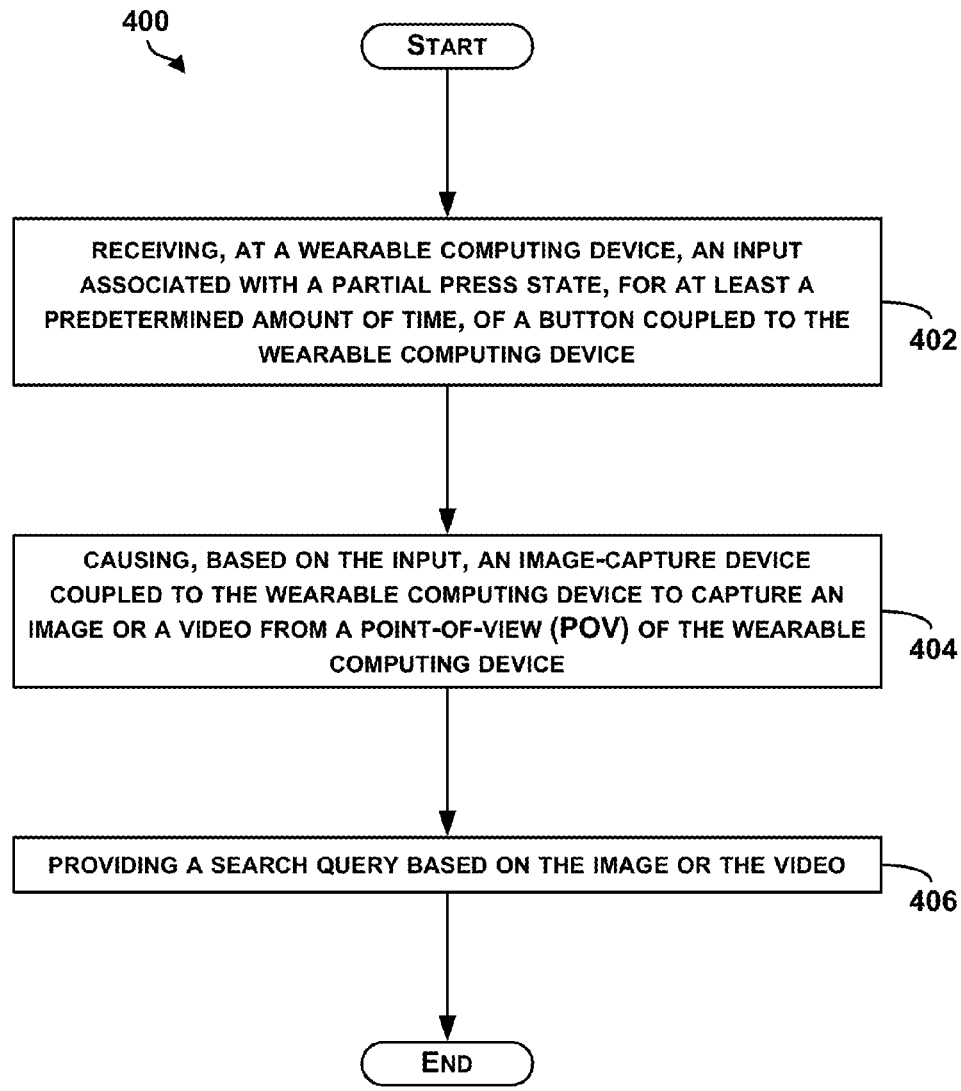
FIG. 4 is a flowchart of an example method for using a multi-state button of a wearable computing device, in accordance with an embodiment.

FIG. 4 is a flow chart of an example method 400 for using a multi-state button of a wearable computing device, in accordance with an embodiment.

The method 400 may include one or more operations, functions, or actions as illustrated by one or more of blocks 402-406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 400 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block in FIG. 4 may represent circuitry that is wired to perform the specific logical functions in the process.

At block 402, the method 400 includes receiving, at a wearable computing device, an input associated with a partial press state, for at least a predetermined amount of time, of a button coupled to the wearable computing device. A wearable computing device, such as the wearable computing device described in FIGS. 1A-3, may be configured to receive the input associated with a press state of the button. The button may be a multi-state button with functionality based on the press state of the button. As an example, the button may be a two-stage button comprising a partial press state and a full-press state of the button. The partial press state may include, for example, a given press of the button between an un-pressed state and the full-press state of the button. In some examples, the partial press state can be referred to as half-press state. The wearable computing device may be configured to receive the input associated with the partial press state when the partial press of the button occurs for at least a predetermined amount of time. A given partial press of the button occurring for less that the predetermined amount of time may be characterized as a transitory condition from an un-pressed state to a fully pressed state, and not an intended partial press of the button, for example.

Figure 5:
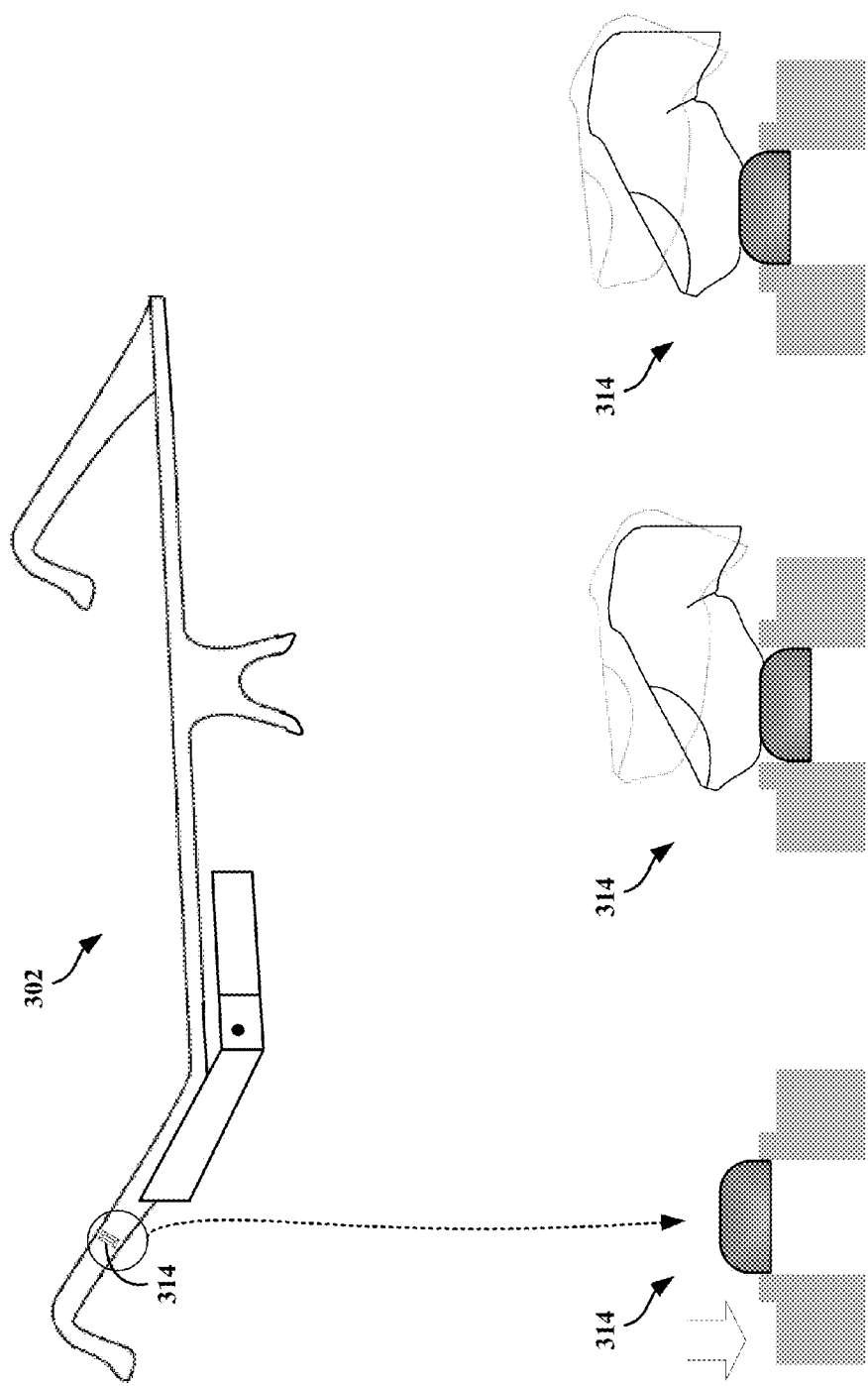
FIGS. 5A-5C illustrate an example multi-state button, in accordance with an embodiment.

FIGS. 5A-5C illustrate an example multi-state button, in accordance with an embodiment. FIG. 5A illustrates the button 314 of the wearable computing device 302 in an un-pressed state, for example. FIG. 5B illustrates the button 314 in a pressed state (e.g., a full press state). FIG. 5C illustrates the button 314 in a partial press state. The partial press state may comprise the button in a state that is a location between the un-pressed state and the full press state. In one example, the wearable computing device 302 may be configured to generate a display of an indication of the press state on a display device (e.g., a head-mounted display) coupled to the wearable computing device 302. As an example, the wearable computing device 302 may generate a display of a symbol or icon corresponding to a current press state.

FIGS. 5A-5C illustrate the button in an example configuration (e.g., a member moving slidably in a passage) for illustration only. Other configurations are possible. For example, button functionality may be simulated by finger movement on a touch-pad. Other button configurations and examples are possible.

Referring back to FIG. 4, at block 404, the method 400 includes causing, based on the input, an image-capture device coupled to the wearable computing device to capture an image or a video from a point-of-view (POV) of the wearable computing device. In an example, the wearable computing device may be configured to cause an image-capture device coupled to the wearable computing device to capture an image from a point-of-view (POV) of the wearable computing device, based on the input corresponding to a first press state of the button. The first press state may be represented, for example, by the press state illustrated in FIG. 5B. As an example, the first press state may include a press (e.g., a full-press) of the button and a quick release (e.g., no hold or dwell time while pressing the button).

As an example, the image-capture device may include the camera 120 in FIG. 1A, or the camera 206 in FIG. 2, or the camera 312 in FIG. 3 or any other image-capture device coupled to a respective wearable computing device.

In an example, the wearable computing device may include a head-mounted display (HMD) worn by a user and the image, in this example, may provide an indication of what the user of the wearable computing device or the HMD is looking at.

The image may be stored on a memory coupled to the wearable computing device. The wearable computing device may be configured to generate a display of the image, or an icon representing the image, on a display device (e.g., the HMD) coupled to the wearable computing device.

In another example, the wearable computing device may be configured to cause the image-capture device to capture a video from the POV of the wearable computing device, based on the input corresponding to a second press state of the button, where the first press state and the second press state are distinguishable based on pressed periods of time related to the press state of the button. The second press state may be represented, for example, by the press state illustrated in FIG. 5B. As an example, the second press state may include a press and hold for a given amount of time on the button.

The first press state and the second press state may be distinguishable by a respective pressed amount of time. For example, the first press state may occur for a first pressed period of time less than a threshold amount of time (e.g., press and quick release), and the second press state may occur for a second pressed period of time greater than the threshold amount of time (e.g., press and hold for 0.5 seconds). The wearable computing device, thus, may be configured to determine the press state by distinguishing between the first press and the second press and may accordingly be configured to execute respective instructions corresponding to the determined press state.

In one example, the wearable computing device may receive the input corresponding to the first press state and cause the image-capture device to capture the image and then detect a transition from the first press state to the second press state (e.g., the user may continue pressing on the button for an amount of time greater than a given threshold amount of time) and, accordingly, cause the image-capture device to transition into capturing the video.

In the example where the wearable computing device is configured to include the HMD worn by the user, the video may provide an indication of what the user is observing or tracking with the user's eyes.

In examples, the wearable computing device may include an eye-tracking system. The eye-tracking system may include hardware such as an infrared camera and at least one infrared light source. The infrared camera may be utilized by the eye-tracking system to capture images of an eye of a user of the wearable computing device. The images may include either video images or still images or both. The images obtained by the infrared camera regarding the eye of the user may help determine where the user may be looking within a given field of view, for instance, by ascertaining a location of an eye pupil of the user. As another example, the eye-tracking system may include a low power reflectivity sensor system that detects where the eye pupil may be pointing or gazing. The low power reflectivity sensor system may include an infrared (IR) light emitting diode (LED) and photo detector that may be directed at the eye pupil. When the eye pupil gazes at the IR LED, the amount of IR light reflected back to the photo detector may drop, for example. The wearable computing device may, thus, be configured to receive gaze information from the eye-tracking system and to make a determination regarding a direction of a gaze of the user, also termed a gaze axis. The wearable computing device may be configured to determine a wearer-view based on the gaze information and further may be configured to cause the image-capture device to capture the image or the video based on the determined wearer-view.

In still another example, the wearable computing device may be configured to receive the input corresponding to a partial press state of the button, and to cause the image-capture device to capture the image or the video based on the input. The partial press state may be represented, for example, by the press state illustrated in FIG. 5C. The wearable computing device may be configured to receive the input corresponding to the partial press state while the button is pressed to a location between an un-pressed state and the fully pressed state for at least a predetermined amount of time.

In one example, selecting whether to capture the image or the video, based on the input corresponding to the partial press state, may be user-configurable. In another example, the wearable computing device may be configured to cause the image-capture device to capture the video and may be configured to extract still images from the video. In still another example, the wearable computing device may be configured to cause the image-capture device to capture the image and then transition into capturing the video if the button remains partially pressed for an amount of time greater than a threshold amount of time. Other arrangements and options are possible.

At block 406, the method 400 includes providing a search query based on the image or the video. In an example the wearable computing device may be configured to generate a visual search query based on the image and/or the video captured due to the partial press state of the button. The visual search query, for example, may include the image or a query image extracted from the image and/or the video. Further, the visual search query may include metadata associated with an object depicted in the image and/or video (e.g., object features, colors, categorization, etc.). The object may be any natural or man-made object in a field of view of the user (e.g., a building, a logo, a displayed product, a vehicle, etc.).

In one example, the computing device may be configured to communicate (e.g., wirelessly) the visual search query to a search server and, in response to the visual search query, the search server may be configured to recognize the object in the query image based on the associated metadata. The search server may be configured to generate information content based on the recognized object and communicate the information content to the wearable computing device.

In an example, the wearable computing device may be configured to receive the information content or search results and may be configured to generate a display of the search results on a display device (e.g., an HMD) coupled to the wearable computing device. In one example, the wearable computing device may be configured to annotate the image or the video with the search results and generate a display of the annotated image or video on the HMD.

In one example, the wearable computing device may be configured to determine, from the image or the video, context information relating to a context of the wearable computing device. The context may describe an ambient environment (e.g., weather information, sounds, etc.) and/or a circumstance of use of the wearable computing device, for example. The wearable computing device further may be configured to provide the context information in addition to the search query to the search server; and receive search results relating to the search query and the context information from the search server. As an example, a user of the wearable computing device may be looking at a screen displaying a movie trailer. The movie trailer may include a given object and the wearable computing device may be configured to cause the image-capture device to capture a given image or video of the movie trailer and the given object displayed in the movie trailer and provide a respective search query as well as the context information to the search server. The search sever may be configured to provide information about the movie instead of the given object in the movie trailer based on the context information, for example.

In another example, the wearable computing device may be configured to process the image or video to determine the object depicted in the image or the video. For example, the wearable computing device may be configured to use image recognition techniques known in the art to determine the object. In some examples, the wearable computing device may be configured to extract still frames from the video and determine the object depicted in the still frames.

Figure 6:
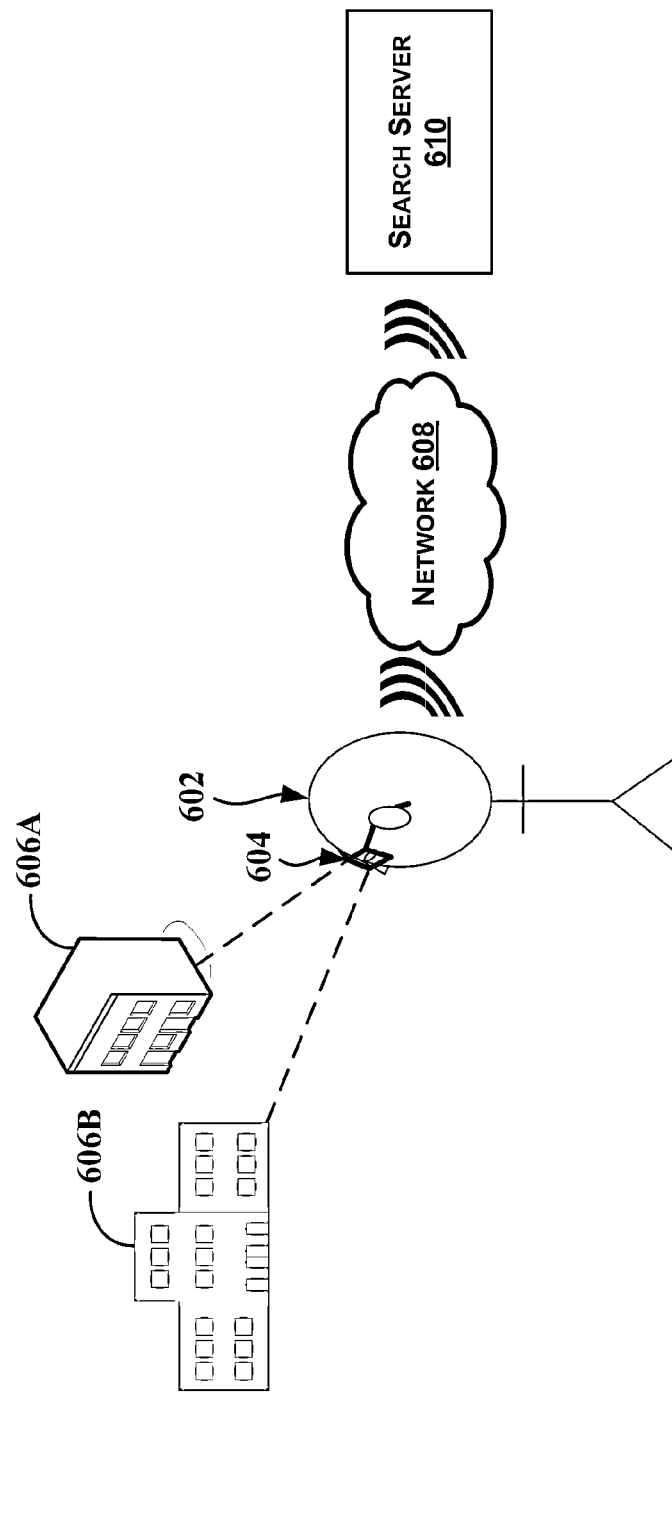
FIG. 6 illustrates an example implementation to describe functionality of the multi-state button, in accordance with an embodiment.

FIG. 6 illustrates an example implementation to describe functionality of the multi-state button, in accordance with an embodiment. In FIG. 6, a user 602 wearing the wearable computing device 604 (e.g., any of the wearable computing devices described in FIGS. 1A-3) may be looking at objects at a given location. For example, the user 602 may be looking at a building 606A or building 606B.

The wearable computing device 604 may be configured to receive an input corresponding to a press (e.g., by the user 602) of a button coupled to the wearable computing device 604 and cause an image-capture device, coupled to the wearable computing device 604, to capture an image from a POV of the user 602 or the wearable computing device 604. As an example, the user 602 may be looking at building 606A and may press a first press with a quick release of the button. The wearable computing device 604 may be configured to receive the input corresponding to the first press and accordingly cause the image-capture device to capture an image of the building 606A.

In another example, the wearable computing device 604 may be configured to receive a respective input corresponding to a second press, by the user 602, and accordingly cause the image-capture device to capture a video of what the user 602 may be tracking or observing (e.g., the buildings 606A-B). The second press of the button may comprise a press and hold of the button, for example.

In still another example, the user 602 may request information about the buildings 606A-B or other objects the user 602 may be looking at. The wearable computing device 604 may be configured to receive a given input corresponding to a partial press of the button by the user 602 and cause the image-capture device to capture a given image or video of what the user 602 may be looking at (e.g., the buildings 606A-B). In one example, a quick partial press and release may cause capturing the given image while a partial press and holding the partial press may cause capturing the given video. In another example, whether to cause capturing the given image or the given video based on the partial press may be user-configurable. Other examples are possible.

The given image may include the building 606A and the wearable computing device 604 may be configured to generate a visual search query that may include the given image of the building 606A in addition to metadata associated with the building 606A (e.g., building features, colors, categorization, etc.). In another example, the wearable computing device 604 may be configured to generate a query image extracted from the given video of the building 606A.

In some examples, the wearable computing device 604 may provide the visual search query through a network 608, which may be wired or wireless, to a search server 610. The search server 610 may be configured to recognize the building 606A in the search query based on the query image and the associated metadata. The search server 610 then may be configured to generate information content based on the recognized building 606A and communicate the information content through the network 608 to the wearable computing device 604. The wearable computing device 604 further may be configured to generate a display of the information content on an HMD coupled to the wearable computing device 604 and also may be configured to annotate the given image of the building 606A with the information content.

In an example, based on the input corresponding to the partial press state of the button, the wearable computing device 604 may be configured to cause the image-capture device to capture the given video; determine that the building 606A has left a field of view of the image-capture device and that the building 606B has entered the field of view of the image-capture device; and accordingly update the visual search query in real-time to include information associated with the building 606B.

In examples, the wearable computing device 604 may be configured to generate a display of a menu on the HMD. The menu may comprise menu items, which may be selectable by the user 602 and may be based on the press state of the button. For example, based on the input corresponding to the first press of the button, the menu items may be associated with still imaging options of the image-capture device. For example, the imaging options may include imaging parameters such as focal depth, resolution, and aperture. The imaging options may also include World Wide Web services options such as sharing images. Further, the imaging options may include camera modes such as manual mode, automatic mode, autofocus, automatic flash, etc. The imaging options may also include special effects such as panoramic images and animating capturing images, etc.). Based on the input corresponding to the second press of the button, the menu items may be associated with video capturing options (e.g., video panorama, High Dynamic Range, etc.). The menu options described can also be displayed based on the input corresponding to the partial press.

In one example, the wearable computing device 604 may be configured to detect a transition from the first press state to the second press state, based on the press periods of time of the button, and may be configured to change at least a subset of the menu items to include video capturing options associated with capturing a video instead of image capturing options associated with capturing an image.

In another example, the wearable computing device 604 may be configured to receive an input corresponding to a given press of the button. In response, the wearable computing device may be configured to generate a display of a given menu including one or more menu items. Also, the wearable computing device 604 may be configured to receive information relating to the user 602 focusing on a menu item of the given menu. The information, for example, may be received through an eye-tracking system or tracking head motion to indicate which menu item the user 602 may be focusing on. Further, the wearable computing device 604 may be configured to receive another input corresponding to another press of the button to indicate a selection of the menu item focused on and may be configured to perform a function corresponding to the selection. As an example for illustration, the wearable computing device 604 may be configured to receive an input corresponding to a partial press state of the button and generate a display of a menu corresponding to the partial press state. The wearable computing device 604 may be configured to receive given information indicative of the user 602 focusing on a menu item of the menu corresponding to capturing an image and sharing the image over the internet, for example. The user 602 may press a full press of the button to select the menu item. In response to receiving a selection of the menu item by receiving a respective input corresponding to the full press state of the button, the wearable computing device 604 may be configured to cause a camera to capture the image and may be configured to share the image over the internet.

Figure 7:
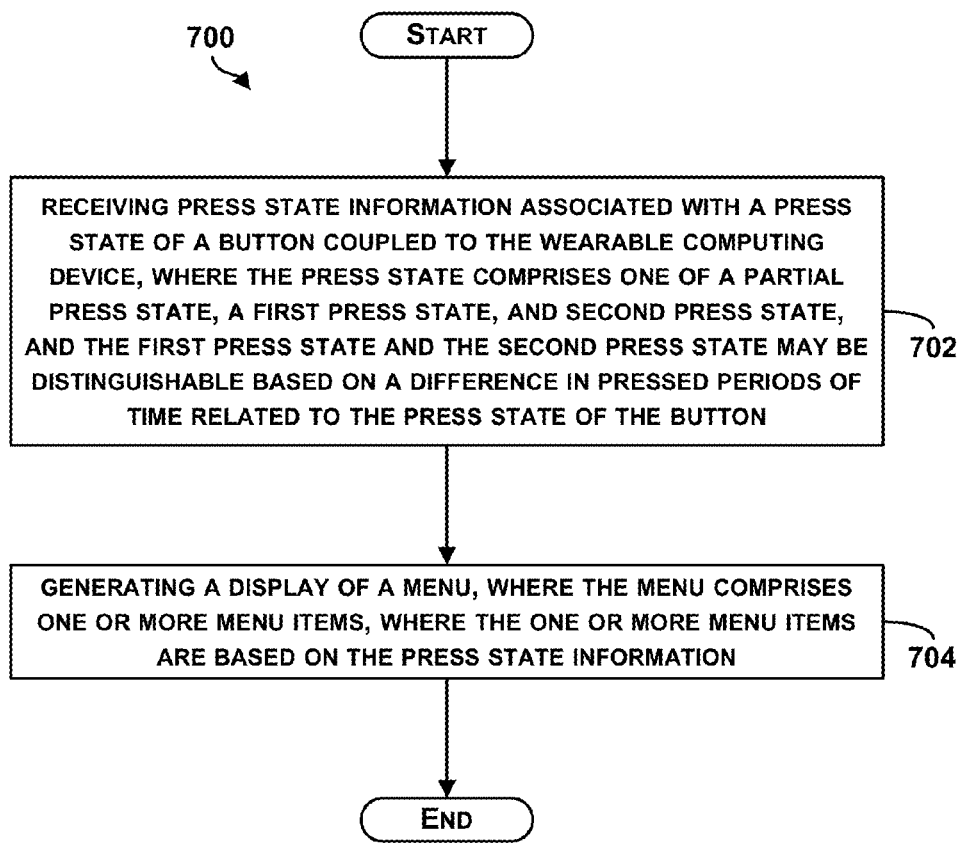
FIG. 7 is a flowchart of another example method for using a multi-state button of a wearable computing device, in accordance with an embodiment.

FIG. 7 is a flowchart of another example method for using a multi-state button of a wearable computing device, in accordance with an embodiment.

The method 700 may include one or more operations, functions, or actions as illustrated by one or more of blocks 702-704. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation At block 702, the method 700 includes receiving press state information associated with a press state of a button coupled to the wearable computing device, where the press state comprises one of a partial press state, a first press state, and second press state, where the first press state and the second press state are distinguishable based on pressed periods of time related to the press state of the button. The wearable computing device may take any of the forms described above in connection with FIGS. 1A-3. The button may be a multi-state button with functionality that is based on the press state of the button. An example of the button is illustrated in FIGS. 5A-5C as described with respect to block 402 of method 400 shown in FIG. 4.

As an example, the button may be a two-stage button comprising a partial press and a full-press of the button. The partial press may include, for example, a given press of the button between an un-pressed state and the full-press of the button.

The first press may be represented, for example, by the press state illustrated in FIG. 5B. As an example, the first press may include a press (e.g., a full-press) on the button and a quick release (e.g., no hold or dwell time while pressing the button).

The second press also may be represented, for example, by the press state illustrated in FIG. 5B. However, the second press may include a press and hold for a given amount of time on the button.

The first press and the second press, thus, may be distinguishable by a respective pressed amount of time. For example, the first press may occur for a first pressed period of time less than a threshold amount of time (e.g., press and quick release), and the second press may occur for a second pressed period of time greater than the threshold amount of time (e.g., press and hold for 0.5 seconds).

At block 704, the method 700 includes generating a display of a menu, where the menu comprises one or more menu items, where the one or more menu items are based on the press state information. The wearable computing device may be configured to determine the one or more menu items to be displayed based on the press state of the button. In one example, the wearable computing device also may be configured to receive transition information associated with a transition from one press state to another and may accordingly be configured to change the one or more menu items based on the transition information.

FIG. 8A illustrates aspects of an example display 800 including menus, in accordance with an embodiment. The wearable computing device may be configured to generate the display 800, for example, on an HMD coupled to the wearable computing device. The display 800 may include a menu 802 that includes a number of menu objects 804. The number of menu objects 804 in the menu 802 may be fixed or may be variable. In examples where the number is variable, the menu objects 804 may vary in size according to the number of menu objects 804 in the menu 802. In an example, the number and content of the menu objects 804 may be based on the press state of the button.

Depending on the application of the wearable computing device and the press state information, the menu objects 804 may take several forms. For example, the menu objects 804 may include people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. The menu objects 804 may take other forms as well.

The menu objects 804 may be fixed or variable. For example, the menu objects 804 may be preselected by a user of the wearable computing device. In another example, the menu objects 804 may be assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some menu objects 804 may be fixed, while other menu objects 804 may be variable. Configuration and content of the menu objects 804 may be based on the press state information received at the wearable computing device.

Menu 806 illustrates a zoomed view on a menu object of the menu objects 804. The menu 806 may include menu items 1-8 that may be relevant to a software application running on the wearable computing device. Eight menu items are shown for illustration only. Any number of menu items can be used. The number and content of the menu items may be based on the press state information. As an example, the wearable computing device may be configured to receive information indicating that the press state includes a partial press of the button and may accordingly display given menu items. The wearable computing device further may receive information indicating that the press state transitioned into full-press (either a first press or a second press depending on the pressed amount of time), and may be configured to change the menu items to respective menu items corresponding to the full press state, for example. Given menu items corresponding to a given press state may be user-configurable or may be set by the wearable computing device, for example.

In some examples, additional content (e.g., actions to be applied to, with, or based on the menu 806, information related to the menu 806, and/or modifiable options, preferences, or parameters for the menu 806, etc.) may be showed adjacent to or nearby the menu 806 and may be based on the press state.

Figure 8B:
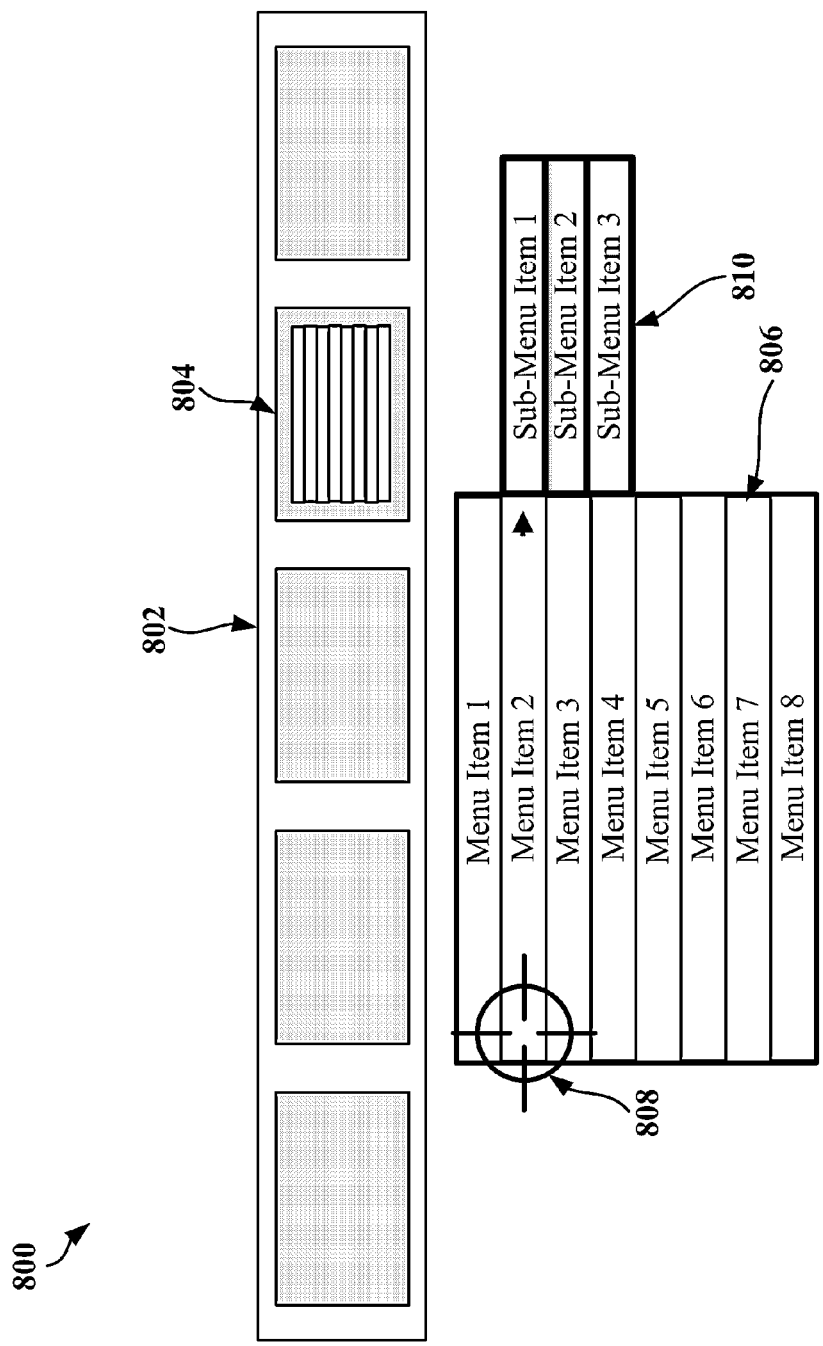
FIG. 8B illustrates aspects of the example display including menus and sub-menus, in accordance with an embodiment.

At least a subset of the menu items of the menu 806 may be selectable by a user and expandable into a list of sub-menu items. FIG. 8B illustrates aspects of the example display 800 with menus and sub-menus, in accordance with an embodiment. For example, the user may navigate a cursor 808 to menu item 2 and, accordingly, the menu item 2 may be expanded into a sub-menu 810. Number and content of the sub-menu items of the sub-menu 810 may also be based on the press state of the button.

Figure 9:
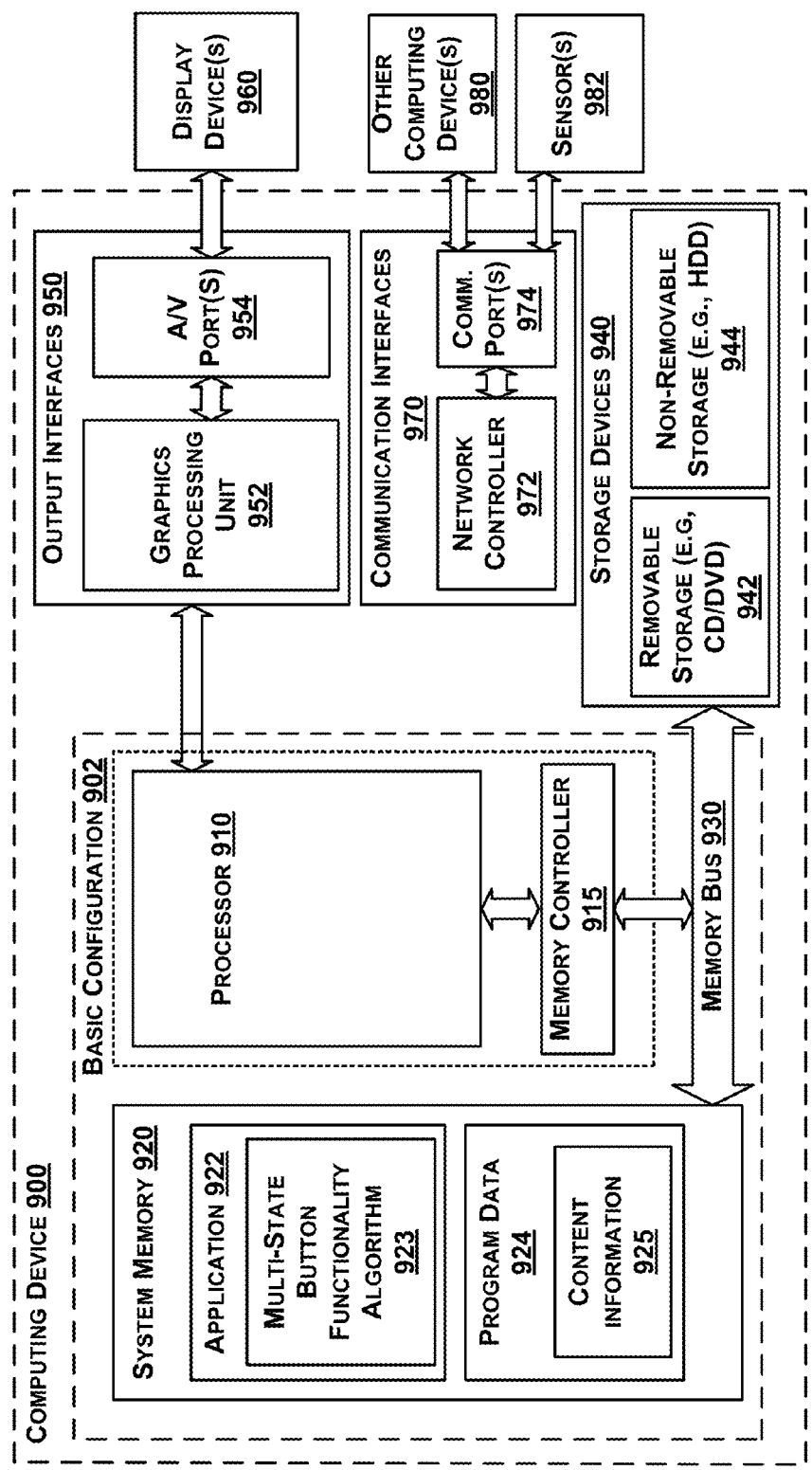
FIG. 9 is a functional block diagram illustrating an example computing device used in a computing system that is arranged in accordance with at least some embodiments described herein.

FIG. 9 is a functional block diagram illustrating an example computing device 900 used in a computing system that is arranged in accordance with at least some embodiments described herein. The computing device may be a personal computer, mobile device, cellular phone, video game system, or global positioning system, and may be implemented as a client device, a server, a system, a combination thereof, or may be part of the wearable computing systems or head-mounted devices shown in FIGS. 1-3. Alternatively, the computing device 900 may be communicatively coupled to the head-mounted devices via a wired or wireless connection.

In a basic configuration 902, computing device 900 may include one or more processors 910 and system memory 920. A memory bus 930 can be used for communicating between the processor 910 and the system memory 920. Depending on the desired configuration, processor 910 can be of any type including but not limited to a microprocessor (µP), a microcontroller (µC), a digital signal processor (DSP), or any combination thereof. A memory controller 915 can also be used with the processor 910, or in some implementations, the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 may include one or more applications 922, and program data 924. Application 922 may include multi-state button functionality algorithm 923 that is arranged to provide inputs to the electronic circuits, in accordance with the present disclosure. Program Data 924 may include content information 925 that could be directed to any number of types of data. In some examples, application 922 can be arranged to operate with program data 924 on an operating system.

Computing device 900 can have additional features or functionality, and additional interfaces to facilitate communications between the basic configuration 902 and any devices and interfaces. For example, data storage devices 940 can be provided including removable storage devices 942, non-removable storage devices 944, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 920 and storage devices 940 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 900. Any such computer storage media can be part of the computing device 900.

The computing device 900 can also include output interfaces 950 that may include a graphics processing unit 952, which can be configured to communicate to various external devices such as display devices 960 or speakers via one or more A/V ports 954 or a communication interface 970. The communication interface 970 may include a network controller 972, which can be arranged to facilitate communications with one or more other computing devices 980 and one or more sensors 982 over a network communication via one or more communication ports 974. The one or more sensors 982 are shown external to the computing device 900, but may also be internal to the device. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In some embodiments, the disclosed methods may be implemented as computer program instructions encoded on a computer-readable storage media in a machine-readable format, or on other non-transitory media or articles of manufacture. FIG. 10 is a schematic illustrating a conceptual partial view of an example computer program product 1000 that includes a computer program for executing a computer process on a computing device, arranged according to at least some embodiments presented herein. In one embodiment, the example computer program product 1000 is provided using a signal bearing medium 1001. The signal bearing medium 1001 may include one or more program instructions 1002 that, when executed by one or more processors may provide functionality or portions of the functionality described above with respect to FIGS. 1-9. Thus, for example, referring to the embodiments shown in FIGS. 4 and 7, one or more features of blocks 402-406 and blocks 702-704 may be undertaken by one or more instructions associated with the signal bearing medium 1001. In addition, the program instructions 1002 in FIG. 10 describe example instructions as well.

In some examples, the signal bearing medium 1001 may encompass a computer-readable medium 1003, such as, but not limited to, a hard disk drive, a Compact Disc (CD), a Digital Video Disk (DVD), a digital tape, memory, etc. In some implementations, the signal bearing medium 1001 may encompass a computer recordable medium 1004, such as, but not limited to, memory, read/write (R/W) CDs, R/W DVDs, etc. In some implementations, the signal bearing medium 1001 may encompass a communications medium 1005, such as, but not limited to, a digital and/or an analog communication medium (e.g., a fiber optic cable, a waveguide, a wired communications link, a wireless communication link, etc.). Thus, for example, the signal bearing medium 1001 may be conveyed by a wireless form of the communications medium 1005 (e.g., a wireless communications medium conforming to the IEEE 802.11 standard or other transmission protocol).

The one or more programming instructions 1002 may be, for example, computer executable and/or logic implemented instructions. In some examples, a computing device such as the computing device 900 of FIG. 9 may be configured to provide various operations, functions, or actions in response to the programming instructions 1002 conveyed to the computing device 900 by one or more of the computer readable medium 1003, the computer recordable medium 1004, and/or the communications medium 1005. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:

receiving, at a wearable computing device, a first input associated with a first press state of a button coupled to the wearable computing device, wherein the button comprises a two-stage button comprising a partial-press state and a full-press state, wherein the partial-press state comprises a given press of the button between an un-pressed state and the full-press state of the button, and wherein the first press state comprises the full-press state;

in response to receiving the first input, causing an image-capture device coupled to the wearable computing device to capture (i) an image from a point-of-view (POV) of the wearable computing device, or (ii) a video from the POV of the wearable computing device;

receiving a second input indicating that the button is in a second press state, for at least a predetermined amount of time, wherein the second press state comprises the partial-press state; and in response to receiving the second input, providing a search query based on the image or the video.

2. The method of claim 1, further comprising:
providing the search query to a search server;
receiving, from the search server, search results relating to the search query; and
generating a display of the search results on a head-mounted display (HMD) coupled to the wearable computing device.

3. The method of claim 2, further comprising generating a display, on the HMD, of the image or the video annotated with the search results.

4. A non-transitory computer readable medium having stored thereon instructions executable by a wearable computing device to cause the wearable computing device to perform functions comprising:
receiving press state information associated with a press state of a button coupled to the wearable computing device, wherein the button includes a two-stage button comprising a partial press state and a full-press state of the button, wherein the partial press state comprises a given press of the button between an un-pressed state and the full-press state of the button, wherein the press state comprises a first press state, a second press state, and a third press state, wherein the first press state and the second press state comprise the full-press state of the button and are distinguishable based on periods of time, and wherein the third press state comprises the partial press state of the button; and
generating a display of a menu, wherein the menu comprises one or more menu items, and wherein the one or more menu items are based on the press state information such that:
the one or more menu items are related to capture of an image based on the press state information indicating that the button is in the first press state,
the one or more menu items are related to capture of a video based on the press state information indicating that the button is in the second press state, and
the one or more menu items are related to providing a search query related to the image or the video to a search engine based on the press state information indicating that the button is in the third press state.

5. The non-transitory computer readable medium of claim 4, wherein the first press state comprises a first pressed period of time less than a threshold amount of time, and the second press state comprises a second pressed period greater than the threshold amount of time.

6. The non-transitory computer readable medium of claim 4, wherein the instructions are further executable by the wearable computing device to cause the wearable computing device to perform functions comprising:
receiving transition information associated with a transition from one press state to another; and
changing the one or more menu items based on the transition information.

7. The non-transitory computer readable medium of claim 4, wherein at least one of the one or more menu items is expandable into a sub-menu, and wherein given sub-menu items of the sub-menu are based on the press state information.

8. A system, comprising:
an image-capture device;
a button configured to provide information associated with a press state of the button, wherein the button includes a two-stage button comprising a partial press state and a full-press state of the button, wherein the partial press state comprises a given press of the button between an un-pressed state and the full-press state of the button, wherein the press state comprises a first press state, a second press state, and a third press state, wherein the first press state and the second press state comprise the full-press state of the button and are distinguishable based on periods of time, and wherein the third press state comprises the partial press state of the button;
a wearable computing device in communication with the image-capture device and the button, wherein the wearable computing device is configured to:
receive an input associated with the press state of the button;
cause the image-capture device to capture an image from a point-of-view (POV) of the wearable computing device, based on the input corresponding to the first press state;
cause the image-capture device to capture a video from the POV of the wearable computing device, based on the input corresponding to the second press state; and
based on the input corresponding to the third press state:
provide a search query based on the image or the video.

9. The system of claim 8, wherein the wearable computing device is further configured to:
provide the search query to a search server;
receive search results relating to the search query from the search server; and
generate a display of the search results on a head-mounted display (HMD) coupled to the wearable computing device.

10. The system of claim 9, wherein the wearable computing device is further configured to:
annotate the image or the video with the search results; and
generate a display of the annotated image or video on the HMD.

11. The system of claim 8, further comprising a head-mounted display (HMD) coupled to the wearable computing device, wherein the wearable computing device is configured to generate a display, on the HMD, of an indication of a current press state.

12. The system of claim 8, further comprising a head-mounted display (HMD) coupled to the wearable computing device, wherein the wearable computing device is further configured to generate a display of a menu on the HMD, wherein the menu comprises one or more menu items, and wherein the one or more menu items are based on the press state.

13. The system of claim 12, wherein the menu comprises one or more menu items expandable into sub-menu items, and wherein content of the one or more menu items and the sub-menu items is based on the press state.

14. The system of claim 12, wherein the one or more menu items are associated with image capturing options associated with capturing the image.

15. The system of claim 8, wherein the first press state comprises a first pressed period of time less than a threshold amount of time, and the second press state comprises a second pressed period of time greater than the threshold amount of time.

16. The system of claim 8, wherein the wearable computing device is further configured to determine that the information associated with the press state indicates that the button is in the first press state,
generate a display of a menu, wherein menu items of the menu include image capturing options associated with capturing the image,
detect a transition from the first press state to the second press state or the third press state, and
change at least a subset of the menu items to include video capturing options associated with capturing the video.

17. The system of claim 8, wherein the wearable computing device is further configured to determine, from the image or the video, context information relating to a context of the wearable computing device, wherein the context information describes at least one of an ambient environment and a circumstance of use of the wearable computing device, provide the context information to a search server, and receive search results relating to the search query and the context information from the search server.

18. The system of claim 8, further comprising an eye-sensing system coupled to the wearable computing device, wherein the wearable computing device is further configured to:

receive, from the eye-sensing system, gaze information relating to a wearer-view associated with the wearable computing device, and determine the wearer-view based on the gaze information, wherein capturing the image or the video is based on the determined wearer-view.

\* \* \* \* \*